350-319.
7-15-75    OR    3,894,795

United States Patent [19]
Laurens

[11] 3,894,795
[45] July 15, 1975

[54] PLURAL ELEMENT WINDOW CONSTRUCTION FOR AN OPENING OF A LASER CAVITY

[75] Inventor: Albert A. Laurens, Paris, France

[73] Assignee: Etat Francais, Paris, France

[22] Filed: Jan. 16, 1974

[21] Appl. No.: 433,887

[52] U.S. Cl............... 350/319; 331/94.5 C; 350/288
[51] Int. Cl.² .... G02B 5/00; G02B 7/00; H01S 3/00
[58] Field of Search.................. 350/319, 213, 292; 331/94.5 C

[56] References Cited
UNITED STATES PATENTS

| | | | |
|---|---|---|---|
| 3,103,712 | 9/1963 | Allinikov et al. | 350/319 X |
| 3,493,291 | 2/1970 | Webb | 350/213 |
| 3,555,450 | 1/1971 | Rockwell | 350/319 X |

FOREIGN PATENTS OR APPLICATIONS

| | | | |
|---|---|---|---|
| 19,900 | 1908 | United Kingdom | 350/292 |
| 19,732 | 1908 | United Kingdom | 350/292 |

*Primary Examiner*—John K. Corbin
*Attorney, Agent, or Firm*—Waters, Schwartz & Nissen

[57] ABSTRACT

A window construction for a laser cavity comprising a plurality of monocrystalline elements transparent to a laser beam assembled in a common plane in fixed, sealed relation by a support constituted by a mounting element and a cover. The cover and mounting element include respective and corresponding central portions, peripheral frames and connecting bars superposed on one another and the monocrystalline elements are secured between the cover and mounting element in lodgements formed by the central portion, peripheral frame and bars.

9 Claims, 13 Drawing Figures

PLURAL ELEMENT WINDOW CONSTRUCTION FOR AN OPENING OF A LASER CAVITY

BACKGROUND

1. Field of the Invention:

The invention relates to a window for a laser cavity, notably for a laser of great power and energy.

2. Prior Art:

Various types of laser cavities are known, as seen from FIGS. 1–3, comprising a cavity C at the opening of which is sealably mounted a window such as $F_1$, $F_2$ or $F_3$. It is known that in stable cavities as in FIGS. 1 and 2, the semi-reflecting planar window $F_1$ or semi-reflecting spherical window $F_2$ is associated with a mirror $M_1$ or $M_2$ disposed at the interior of the cavity. In the unstable cavity of FIG. 3, the window $F_3$ is not reflectant and serves only to assure the seal of the cavity C. In this case a second internal mirror $M_4$ is associated with a first mirror $M_3$.

The windows $F_1$, $F_2$ and $F_3$ are made, for example of gallium arsenide. In general, the best results are obtained, in the case of a laser of great energy, with cavities whose windows are constituted of a monocrystalline block. As a consequence, the size of the window is limited to those of the monocrystalline blocks which can be obtained in practice.

SUMMARY OF THE INVENTION

An object of the invention is to avoid these limitations while providing a window for a laser cavity having greater dimensions than known monocrystalline blocks.

According to the invention, the window of the laser cavity is characterized by a construction comprising at least two elements transparent to light disposed in the same plane and fixed in sealed manner by a mounting at the opening of the cavity.

The use of a multiplicity of transparent elements permits a window construction of great size to be obtained while limiting the size of each element, this being of particular utilization in the case of monocrystalline blocks.

Since the transparent material of the windows absorbs a certain fraction of the light energy passing therethrough, the resulting heating could be sufficient to destroy the window, particularly in high energy apparatus.

According to one embodiment of the invention, the window mounting comprises cooling means constituted by passages contiguous to the edges of the transparent elements of the window and adapted for conveying a cooling fluid. The window mounting comprises a peripheral frame adapted in size to the opening of the cavity and a central part connected to the frame by bars, said bars, frame and central part defining lodgings for the transparent elements of the window. The mounting is provided with a fixed cover which includes, as does the mounting, a peripheral frame, and a central part connected to the frame, the transparent elements of the window being mounted in sealed manner between the mounting and the cover.

This particular construction serves to enhance the convenience of manufacture of the window and its efficiency as will become evident later.

DETAILED DESCRIPTION

Figure 5:
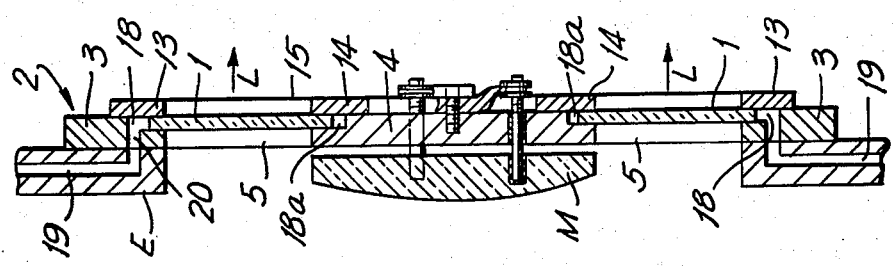
FIG. 5 is a sectional view taken along line V—V in FIG. 4.
Figure 1:
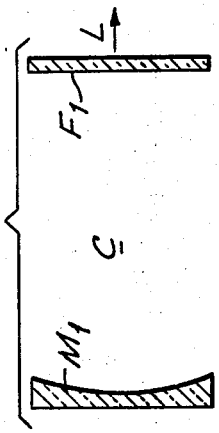
FIGS. 1–3 are schematic illustrations of known apparatus for generating laser beams.
Figure 2:
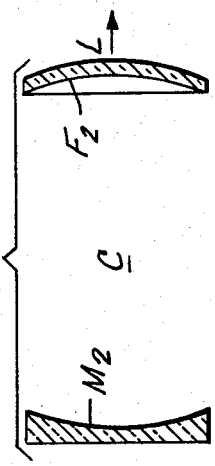
Figure 3:
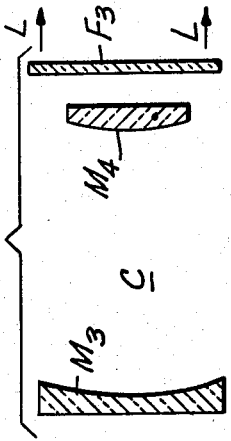

The preferred embodiment will next be described with reference to a cavity of unstable type comprising an internal mirror $M_5$ fixed to the window as shown in FIG. 5 and associated with another mirror (not shown) disposed at the bottom of the cavity in the manner of mirror $M_3$ shown in FIG. 3. It is to be understood, however, that the invention is not limited to unstable cavities.

Figure 4:
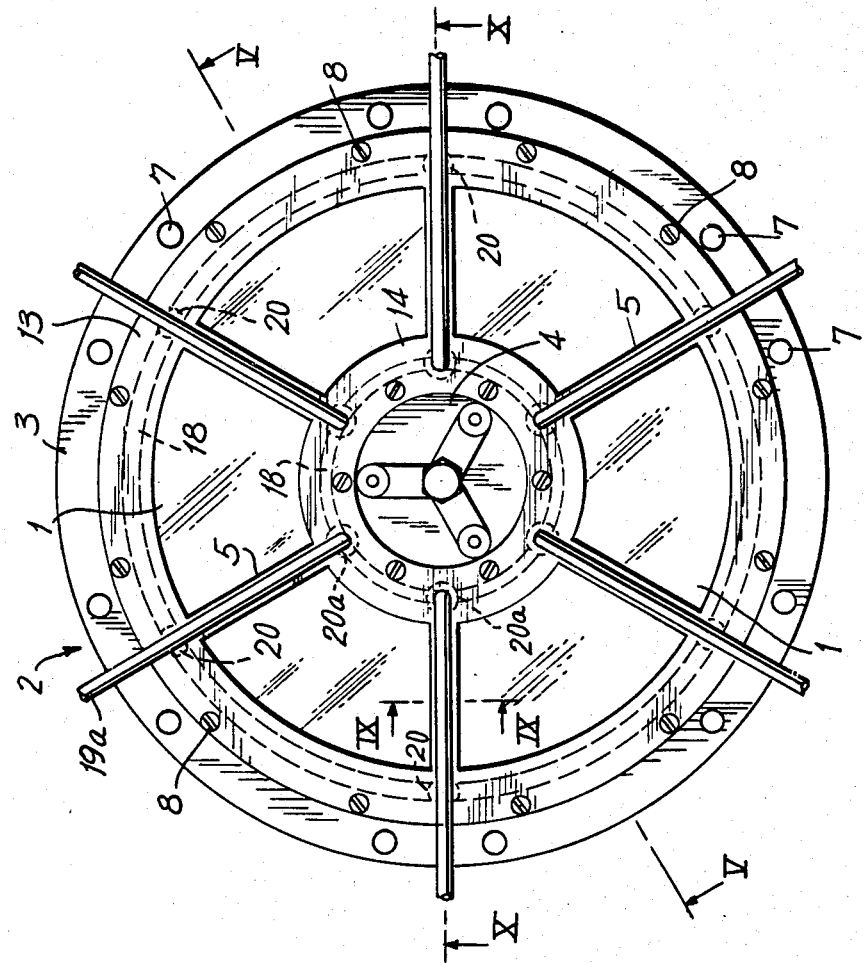
FIG. 4 is a front view of an exit window of a laser cavity according to the invention.

Referring to FIGS. 4 and 5, therein is seen a window for a laser cavity, according to the invention, comprising a plurality of elements 1 transparent to a light beam L, said elements 1 each being a monocrystalline block. These elements 1 are disposed in the same plane and secured in sealed manner at the opening of the cavity (not shown) by a mounting 2 comprising a peripheral frame 3 and a central portion 4 connected to frame 3 by bars 5. The bars 5 define, with frame 3 and central portion 4, a plurality of lodgements or seats for transparent elements 1. The elements 1 are formed as thin sheets with parallel faces machined from a monocrystalline block of a material transparent to a laser beam, such as gallium arsenide. The elements 1 are mounted with slight play J (FIGS. 9 and 11) in the assembly to compensate for thermal expansion of the transparent elements.

The window is provided with a fixed cover which, similar to the mounting, comprises a peripheral frame 13 and a central portion 14 connected to the frame 13 by bars 15. The transparent elements 1 are mounted in sealed manner between the mounting 2 and the cover.

The mounting 2 is fixed at the opening of the cavity (not shown) by means of screws engaged in holes 7. The cover is fixed to the mounting by screws 8. The sealability of the fixation of the transparent elements 1 between the mounting 2 and the cover is effected by O-rings 17 mounted in grooves in the mounting 2 and in the cover. These seal joints are completed by an expansible substance (not shown) filling the interstices corresponding to play J in FIG. 9.

Figure 7:
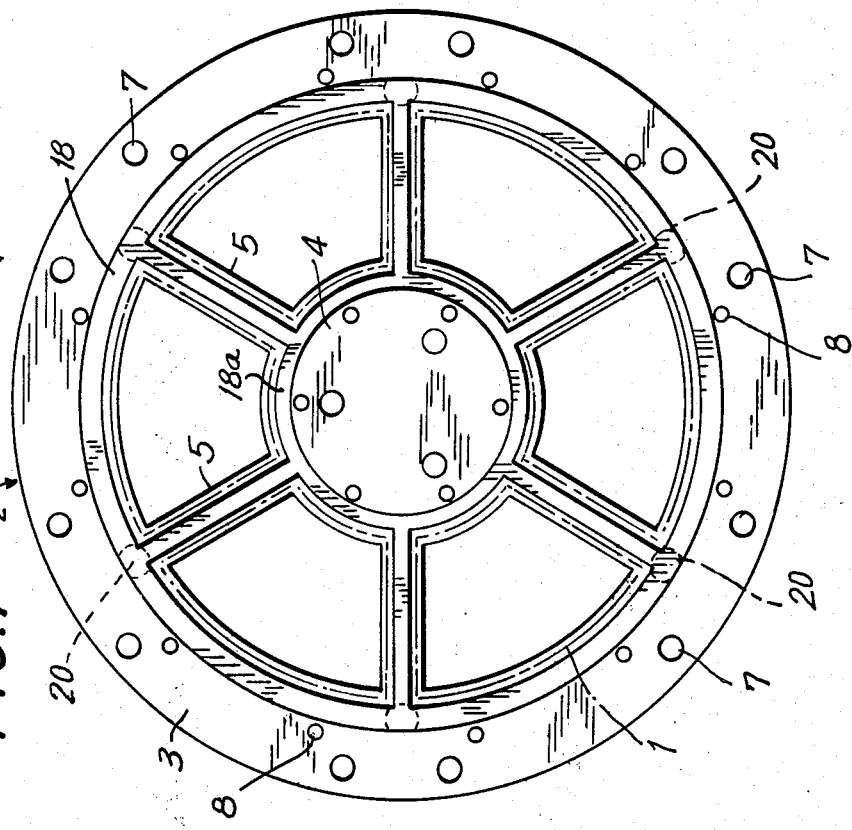
FIG. 7 is a front view of the internal section of the window mounting of FIG. 4.

To compensate for the heating effect of the transparent elements of the window under the effect of the laser beam L passing therethrough, the window comprises a cooling means constituted by channels 18, 18a formed in frame 3 and in the central portion 14 of the mounting (FIGS. 7, 10 and 11) for the passage of a cooling fluid.

The channels 18, 18a are contiguous to the edges of the transparent elements 1 adjacent the frame and the central portion and the cooling fluid circulating in these channels is in direct contact with the edges of elements 1. The supply and discharge of the cooling fluid is effected by means of conduits 19, 19a connected in an external circuit (not shown) including a reservoir, a heat exchanger, and a pump. The fluid can be a liquid or a gas.

Figure 6:
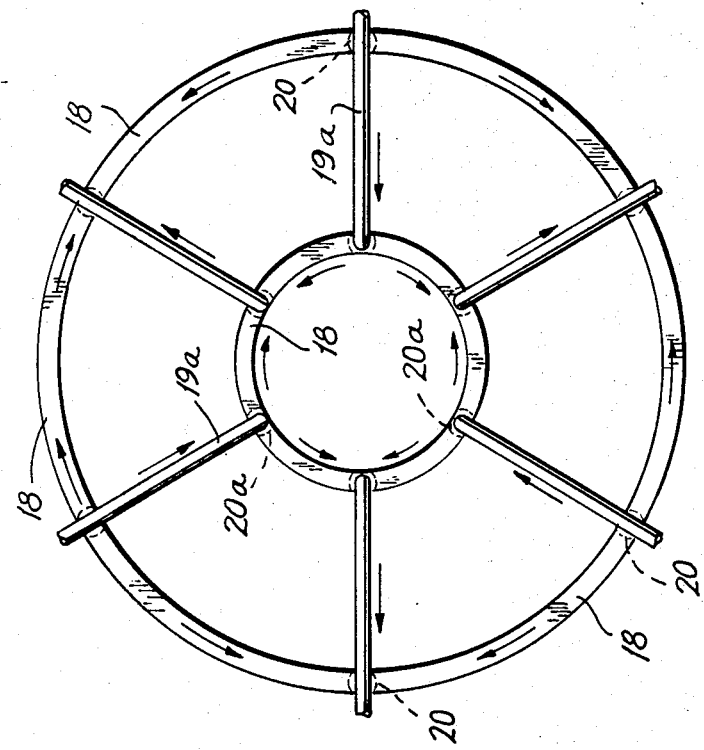
FIG. 6 is a diagrammatic illustration of a cooling circuit for the window of FIG. 4.
Figure 8:
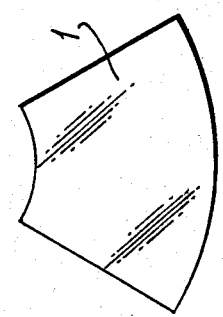
FIG. 8 is a front view of a transparent element of the window of FIG. 4.
Figure 10:
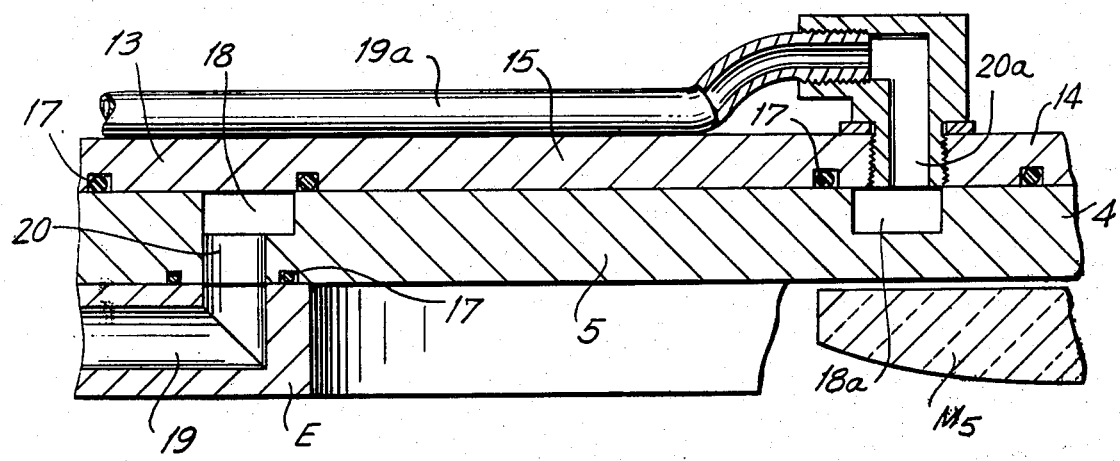
FIG. 10 is a portion of a section taken along line X—X in FIG. 4.
Figure 11:
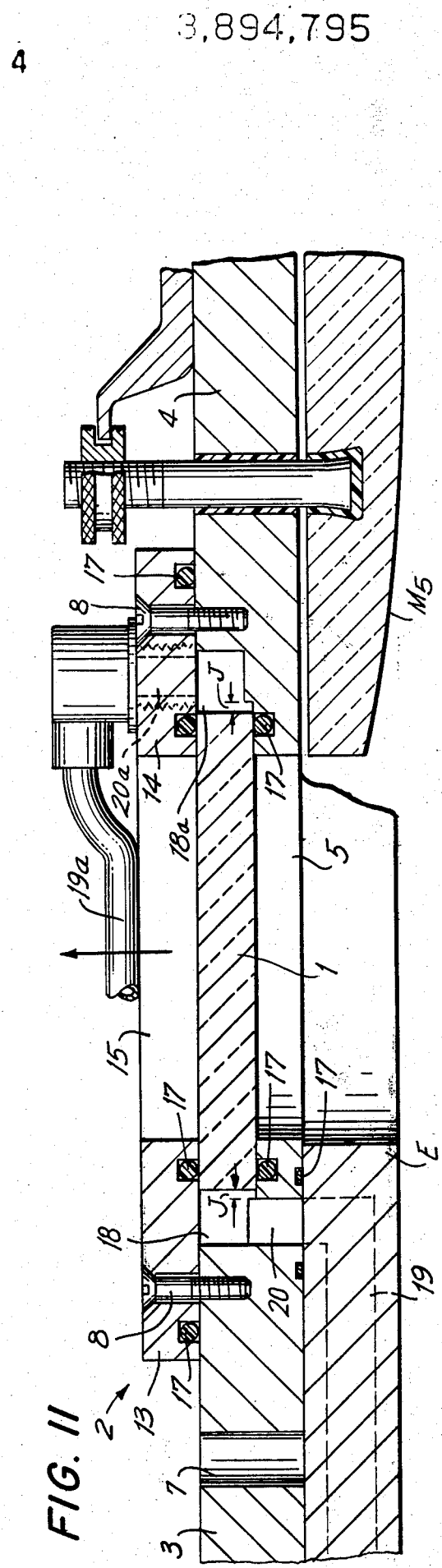
FIG. 11 is a portion of a section taken along line V—V in FIG. 4 showing greater detail than FIG. 5.

A schematic outline of the path of the cooling fluid is shown in FIG. 6. Additionally, in FIGS. 10 and 11 are seen the conduits 19, 19a which are connected to the channels 18, 18a by means of holes 20, 20a disposed perpendicularly to the bars 5, 15. The holes 20 traverse the frame 3 to communicate with peripheral channel 18 whereas holes 20a traverse the central portion 14 of the cover to communicate with the central channel 18a of the central portion 4 of the mounting 2.

The conduits 19 which correspond to the channel 18 of the peripheral frame 3 are formed as ducts in mouthpiece E of the laser cavity. The mouthpiece E serves as a stand for the mounting 2 whose peripheral frame 3 is fixed to the mouthpiece E by screws (not shown) passing in holes 7.

Figure 9:
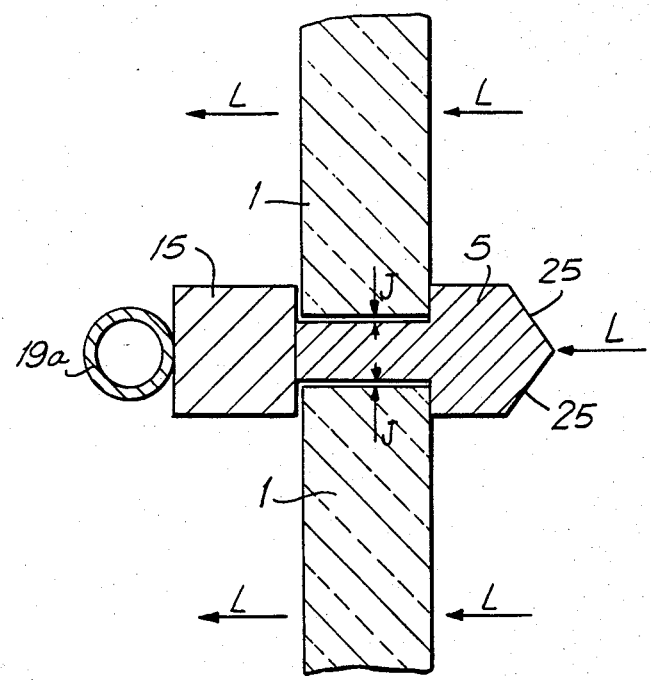
FIG. 9 is a sectional view through a bar of the window taken along line IX—IX in FIG. 4.

The conduits 19a which correspond to the channel 18a in the central portion 4 are fixed to the bars 15 of the cover as seen in FIGS. 9–11.

To eliminate amplification of parasitic reflections to the interior of the cavity, the internal surfaces of the bars 5 of the mounting directly subjected to laser beam L are formed with inclined faces with respect to the parallel faces of the transparent elements 1 of the window as seen in FIG. 9.

The inclination of surfaces 25 of bars 5 additionally serves to reduce the heating effect and this is further attenuated by constructing surfaces 25 as polished surfaces to promote the light reflection.

The efficiency of the good focussing of the beam in a remote field is not substantially affected by the presence of the superposed bars 5, 15 whose surface area is relatively small compared to the transparent elements as seen in FIG. 9.

The construction of the invention has a number of advantages compared to the known constructions. If the window is locally damaged, it is possible to replace only the affected element and not the entire window. In the known windows for unstable cavities, cooling by circulation of a fluid can be effected only at the periphery, whereas according to the invention cooling is also effected at the central portion to reduce thermal differential stresses. Moreover, thanks to the disposition of the invention, mechanical stresses ordinarily present in the window are also reduced which enhances the performance of the laser and the durability of the window.

Of course, the invention is not limited to the embodiments which have been described by way of example only, and many variations and modifications are possible within the domain of the invention.

By way of example, the invention contemplates a window construction adapted for rectangular openings corresponding to certain particular types of laser cavities.

Figure 13:
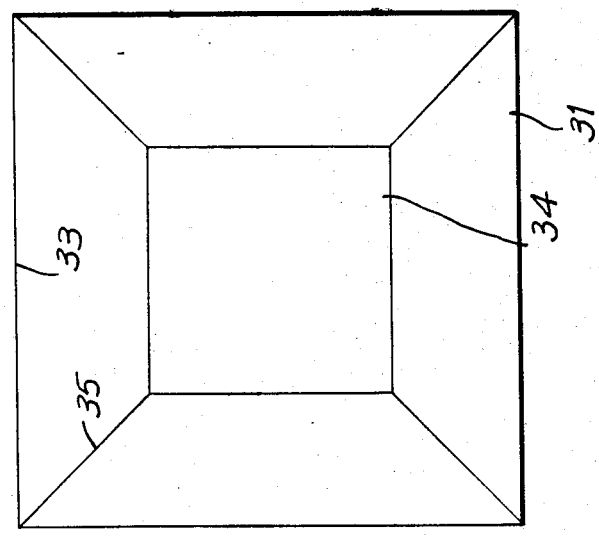
FIGS. 12 and 13 are schematic illustrations of variations of windows according to the invention for cavities having square openings.
Figure 12:
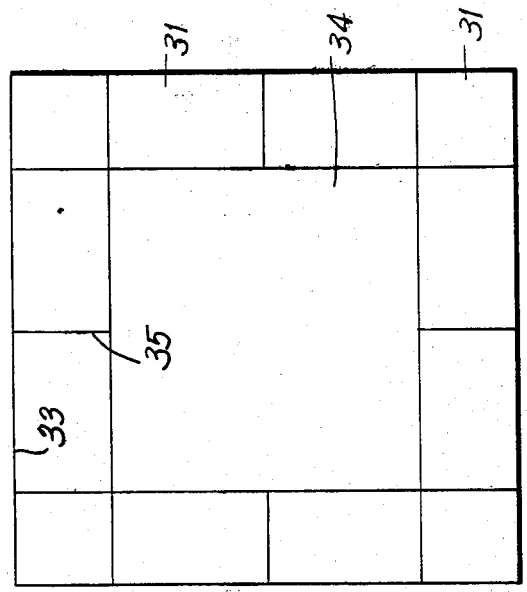

Such rectangular windows are schematically shown in FIGS. 12 and 13 and include transparent peripheral elements 31 disposed around a central portion 34 (analogous to central portion 4 of FIGS. 4 and 5) connected to a peripheral frame 33 by means of bars 35.

A mirror (not shown) analogous to mirror $M_5$ of FIGS. 5 and 11 is carried by central portion 34 whose rectangular contour conforms to that of the mirror.

What is claimed is:

1. A window construction for a laser cavity having an opening, said construction comprising at least two elements transparent to a laser beam, and fixed support means for mounting said elements in a common plane in fixed, sealed relation at the opening of the laser cavity, said transparent elements being monocrystalline and having inner faces which are freely open into the laser cavity and outer faces which are freely open to the exterior.

2. A construction as claimed in claim 1 wherein each element is a sheet having parallel faces.

3. A construction as claimed in claim 1 wherein said support means includes means for cooling said elements.

4. A construction as claimed in claim 1 wherein said support means comprises a mounting element including a peripheral frame adapted for being secured around the opening of the laser cavity, a central portion, and bars connecting said central portion to said peripheral frame, said frame, central portion, and bars defining lodgings for said transparent elements.

5. A construction as claimed in claim 4 wherein said mounting element is provided with passages therein contiguous to said transparent elements at the edges thereof and adapted for flow of a cooling fluid therethrough to cool said transparent elements.

6. A construction as claimed in claim 4 comprising means for connecting an internal mirror to said central portion of the mounting element.

7. A construction as claimed in claim 4 wherein said bars have surfaces facing the laser beam which have faces inclined with respect to the faces of the transparent elements.

8. A construction as claimed in claim 7 wherein said inclined faces are polished.

9. A window construction for a laser cavity having an opening, said construction comprising at least two elements transparent to a laser beam, and support means for mounting said elements in a common plane in fixed, sealed relation at the opening of the laser cavity, said support means comprising a mounting element including a peripheral frame adapted for being secured around the opening of the laser cavity, a central portion, bars connecting said central portion to said peripheral frame; said frame, central portion, and bars defining lodgings for said transparent elements, a fixed cover on said mounting element, said cover including a peripheral frame, a central portion and further bars connecting the central portion to the peripheral frame, said peripheral frame, central portion and further bars of the cover being superposed on those of said mounting element with the transparent elements disposed therebetween and sealed thereto.

* * * * *